US012532444B1

(12) United States Patent
Schieber et al.

(10) Patent No.: US 12,532,444 B1
(45) Date of Patent: Jan. 20, 2026

(54) WAVE SOLDER FINGER DETECTION SYSTEM AND METHOD

(71) Applicant: Illinois Tool Works Inc., Glenview, IL (US)

(72) Inventors: Jackson Schieber, Columbia, MO (US); Jonathan M. Dautenhahn, Lake Ozark, MO (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/952,163

(22) Filed: Nov. 19, 2024

(51) Int. Cl.
| | | |
|---|---|---|
| B23K 1/00 | (2006.01) | |
| B23K 1/08 | (2006.01) | |
| B23K 3/00 | (2006.01) | |
| B23K 3/08 | (2006.01) | |
| G01P 13/00 | (2006.01) | |
| H05K 13/00 | (2006.01) | |
| H05K 13/08 | (2006.01) | |
| B23K 101/42 | (2006.01) | |

(52) U.S. Cl.
CPC ......... *H05K 13/0061* (2013.01); *B23K 1/085* (2013.01); *B23K 3/08* (2013.01); *G01P 13/00* (2013.01); *H05K 13/08* (2013.01); *B23K 2101/42* (2018.08)

(58) Field of Classification Search
CPC .... B23K 3/08; B23K 3/0676; B65G 2207/14; B65G 37/005; B65G 17/323
See application file for complete search history.

(56) References Cited

U.S. PATENT DOCUMENTS

| | | | | |
|---|---|---|---|---|
| 3,179,237 A | * | 4/1965 | Ninneman | B67B 3/2046 53/313 |
| 3,848,864 A | * | 11/1974 | Dwyer | B23K 3/087 198/801 |
| 4,779,350 A | * | 10/1988 | Renner | G01B 5/14 33/501.05 |
| 4,779,717 A | * | 10/1988 | Eberle | B65H 29/003 271/204 |
| 4,821,948 A | * | 4/1989 | Fisher | B23K 3/082 228/43 |
| 4,874,081 A | * | 10/1989 | Kondo | H05K 13/0061 198/817 |
| 5,029,696 A | * | 7/1991 | Van Tilburg | B65G 37/005 198/626.1 |

(Continued)

*Primary Examiner* — Erin B Saad
(74) *Attorney, Agent, or Firm* — Lando & Anastasi, LLP

(57) ABSTRACT

A wave soldering machine includes a wave soldering station configured to create a solder wave used to perform the wave soldering operation on the printed circuit board. The wave soldering machine further includes a finger conveyor system configured to deliver a printed circuit board to the wave soldering station. The finger conveyor system includes at least one chain conveyor including a chain having a plurality of fingers configured to support an edge of the printed circuit board. The finger conveyor system further includes a finger detection system having a tension roller assembly configured to engage each finger of the plurality of fingers. The tension roller assembly further is configured to move in response to engaging a finger in a non-operational position. The finger conveyor system further includes a sensor configured to detect movement of the tension roller assembly to the non-operational position.

19 Claims, 11 Drawing Sheets

(56) References Cited

U.S. PATENT DOCUMENTS

| | | | | |
|---|---|---|---|---|
| 5,065,692 | A | * | 11/1991 | Hollesen ................ B05B 15/52 239/210 |
| 5,845,763 | A | | 12/1998 | Van Tilburg |
| 5,915,525 | A | * | 6/1999 | Baker ................ H05K 13/0061 198/604 |
| 5,967,398 | A | * | 10/1999 | Fritz, Sr. ................ B23K 3/08 228/49.5 |
| 6,170,733 | B1 | * | 1/2001 | Fritz, Sr. ............. B23K 3/0676 228/49.5 |
| 6,415,972 | B1 | * | 7/2002 | Leap ................... B23K 3/0653 228/49.5 |
| 6,786,326 | B2 | * | 9/2004 | Hiramoto ............. B65G 37/005 198/836.2 |
| 9,609,794 | B2 | * | 3/2017 | Endress ................ B23K 1/008 |
| 2003/0057257 | A1 | * | 3/2003 | Leap ................... B23K 3/0653 228/102 |
| 2013/0015043 | A1 | * | 1/2013 | Tout ...................... B65G 19/10 198/810.04 |
| 2013/0283749 | A1 | * | 10/2013 | Adamczyk ........... A01D 45/023 198/814 |
| 2016/0120079 | A1 | * | 4/2016 | Endress ............... B65G 17/323 198/803.7 |

* cited by examiner

WAVE SOLDER FINGER DETECTION SYSTEM AND METHOD

BACKGROUND OF DISCLOSURE

1. Field of Disclosure

The present disclosure relates generally to apparatus and methods for manufacturing printed circuit boards and for assisting a process of soldering metals to integrated circuit boards, and more particularly to a wave soldering machine having a finger conveyor configured with a finger detection system to detect a finger that is out of position or specification.

2. Discussion of Related Art

In the fabrication of printed circuit boards, electronic components can be mounted to a printed circuit board by a process known as "wave soldering." In a typical wave soldering machine, a printed circuit board (sometimes referred to as a "PCB") is moved by a conveyor on an inclined path past a fluxing station, a pre-heating station, and finally a wave soldering station. At the wave soldering station, a wave of solder is caused to well upwardly (by means of a pump) through a wave solder nozzle and contact portions of the printed circuit board to be soldered.

In some embodiments, the conveyor embodies a finger conveyor system including a plurality of fingers configured to support the printed circuit board. It is not unusual for fingers to become misaligned or jammed during operation of the finger conveyor system. Further, fingers that are improperly set or calibrated can misfunction during operation. Such defects can cause damage to the printed circuit board or its support, e.g., a tray, or cause damage to the conveyor system, including other fingers of the conveyor system.

SUMMARY OF DISCLOSURE

One aspect of the present disclosure is directed to a wave soldering machine to perform a wave soldering operation on a printed circuit board. In one embodiment, the wave soldering machine comprises a housing and a wave soldering station coupled to the housing. The wave soldering station is configured to create a solder wave used to perform the wave soldering operation on the printed circuit board. The wave soldering machine further comprises a finger conveyor system coupled to the housing and configured to deliver a printed circuit board through the housing to the wave soldering station. The finger conveyor system includes at least one chain conveyor including a chain having a plurality of fingers configured to support an edge of the printed circuit board. The finger conveyor system further includes a finger detection system positioned proximate to the at least one chain conveyor. The finger detection system includes a tension roller assembly configured to engage each finger of the plurality of fingers. The tension roller assembly further is configured to move in response to engaging a finger in a non-operational position. The finger conveyor system further includes a sensor configured to detect movement of the tension roller assembly to the non-operational position.

Embodiments of the wave soldering system further may include configuring the at least one chain conveyor to include a first chain conveyor having a first chain with a first plurality of fingers configured to support an edge of the printed circuit board and a second chain conveyor having a second chain with a second plurality of fingers configured to support an opposite edge of the printed circuit board. The finger detection system may be associated with each chain conveyor. The first chain conveyor may be spaced from the second chain conveyor. Each chain conveyor may include a chain that runs over a sprocket provided at an end of the chain conveyor. Each chain conveyor further may include a plurality of fingers connected to the chain to convey the printed circuit board through the frame of the wave soldering machine. The finger detection system may include a bracket configured to be coupled to the housing. The bracket may include a top flange configured to be secured to the housing and a bottom flange configured to pivotally support the tension roller assembly and to support the sensor. The tension roller assembly may include a roller bracket, a tension roller, a post, and a spring, which are configured to bias the tension roller in a first position, which is spaced from the non-operational position. The roller bracket may include a top tab configured to be secured to the top flange of the bracket via the spring and a bottom tab configured to support the tension roller. The roller bracket further may include a middle portion having a cylindrical portion configured to slide over the post to enable the roller bracket to pivot with respect to the bracket. The tension roller under the tension of the spring may be normally disposed in the first position in which a middle portion of the roller bracket engages an edge of the top flange of the bracket. The tension roller may be configured to achieve a second position in which the tension roller pivots away from the bracket. The sensor may be coupled to a controller. The sensor may be configured to detect movement of the tension roller to the second position and generate a signal to the controller. The finger detection system further may include an engagement plate configured to engage a finger of the plurality of fingers when the tension roller is in the first position.

Another aspect of the present disclosure is directed to a finger conveyor system for a wave soldering machine configured to perform a wave soldering operation on a printed circuit board. In one embodiment, the finger conveyor system comprises at least one chain conveyor including a chain having a plurality of fingers configured to support an edge of the printed circuit board and a finger detection system positioned proximate to the at least one chain conveyor. The finger detection system includes a tension roller assembly configured to engage each finger of the plurality of fingers. The tension roller assembly further may be configured to move in response to engaging a finger in a non-operational position. The finger detection system further includes a sensor configured to detect movement of the tension roller assembly to the non-operational position.

Embodiments of the finger conveyor system further may include configuring the at least one chain conveyor to include a first chain conveyor having a first chain with a first plurality of fingers configured to support an edge of the printed circuit board and a second chain conveyor having a second chain with a second plurality of fingers configured to support an opposite edge of the printed circuit board. The finger detection system may be associated with each chain conveyor. The first chain conveyor may be spaced from the second chain conveyor. Each chain conveyor may include a chain that runs over a sprocket provided at an end of the chain conveyor. Each chain conveyor further may include a plurality of fingers connected to the chain to convey the printed circuit board through the frame of the wave soldering machine. The finger detection system may include a bracket configured to be coupled to the housing. The bracket may include a top flange configured to be secured to housing and a bottom flange configured to pivotally support a tension roller assembly and to support the sensor. The tension roller assembly may include a roller bracket, a tension roller, a post, and a spring, which are configured to bias the tension roller in a first position, which is spaced from the non-operational position. The roller bracket may include a top tab configured to be secured to the top flange of the bracket via the spring and a bottom tab configured to support the tension roller. The roller bracket further may include a middle portion having a cylindrical portion configured to slide over the post to enable the roller bracket to pivot with respect to the bracket. The tension roller under the tension of the spring may be normally disposed in the first position in which a middle portion of the roller bracket engages an edge of the top flange of the bracket. The tension roller may be configured to achieve a second position in which the tension roller pivots away from the bracket. The sensor may be coupled to a controller. The sensor may be configured to detect movement of the tension roller to the second position and generate a signal to the controller. The finger detection system further may include an engagement plate configured to engage a finger of the plurality of fingers when the tension roller is in the first position.

Yet another aspect of the present disclosure is directed to a method of detecting a finger of a finger conveyor system in a non-operational position within a wave soldering machine configured to perform a wave soldering operation on a printed circuit board. In one embodiment, the method comprises: supporting an edge of the printed circuit board with at least one chain conveyor including a chain having a plurality of fingers; and detecting whether a finger of the plurality of fingers is in a non-operation position with a tension roller assembly configured to engage each finger of the plurality of fingers, the tension roller assembly further being configured to move in response to engaging a finger in a non-operational position.

Embodiments of the method further may include detecting whether the finger of the plurality of fingers is in the non-operational position by sensing movement of the tension roller assembly to the non-operational position. The at least one chain conveyor may include a first chain conveyor having a first chain with a first plurality of fingers configured to support an edge of the printed circuit board and a second chain conveyor having a second chain with a second plurality of fingers configured to support an opposite edge of the printed circuit board. The finger detection system may be associated with each chain conveyor. The tension roller assembly may include a roller bracket, a tension roller, a post, and a spring, which are configured to bias the tension roller in a first position, which is spaced from the non-operational position. Sensing movement of the tension roller assembly may be achieved by a sensor coupled to a controller. The sensor may be configured to detect movement of a tension roller of the tension roller to the second position and generate a signal to the controller.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
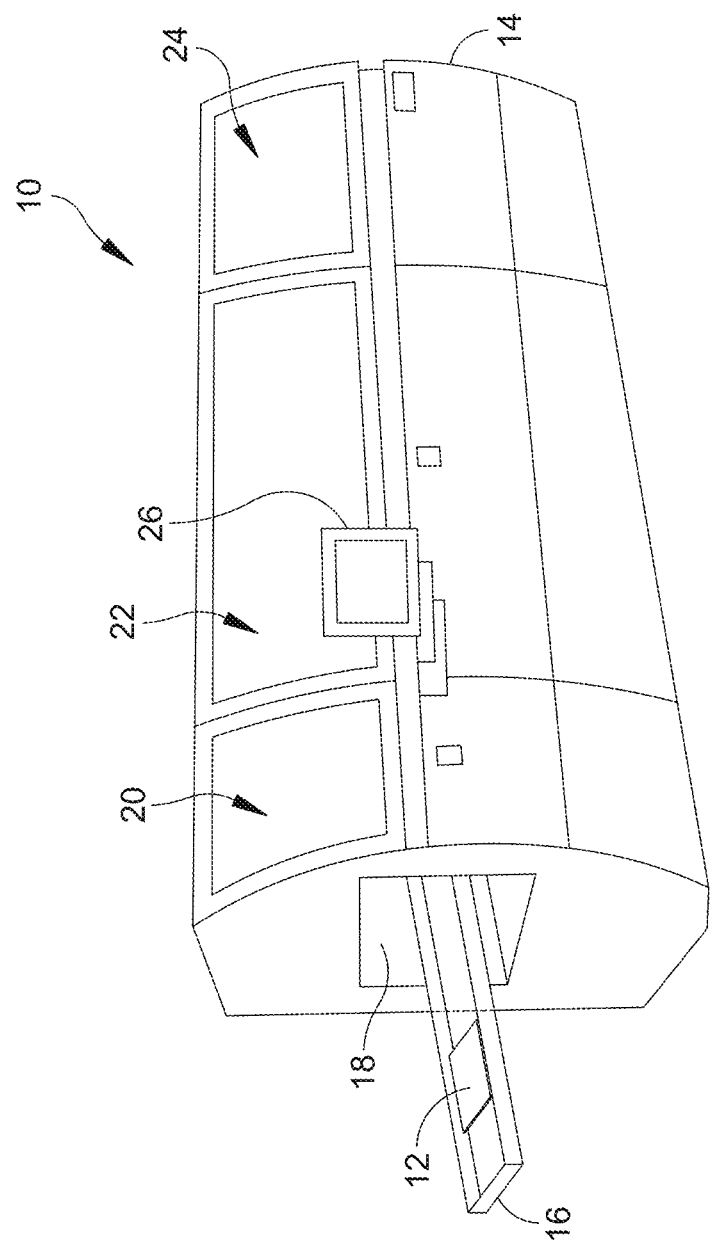
FIG. 1 is a perspective view of a wave soldering machine.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Embodiments of the present disclosure are directed to finger detection system that is configured to detect and identify a finger of a finger conveyor system that is misaligned or installed improperly, which may be referred to as being in a non-operational position.

For purposes of illustration, and with reference to FIG. 1, embodiments of the present disclosure will now be described with reference to a wave soldering machine, generally indicated at 10, which is used to perform a solder application on a printed circuit board 12. The wave soldering machine 10 is one of several machines in a printed circuit board fabrication/assembly line. As shown, the wave soldering machine 10 includes a housing or frame 14 adapted to house the components of the wave soldering machine 10. The arrangement is such that a conveyor 16 delivers printed circuit boards to be processed by the wave soldering machine 10. Upon entering the wave soldering machine 10, each printed circuit board 12 travels along an inclined path (e.g., six degrees with respect to horizontal) along the conveyor 16 through a tunnel 18, which includes a fluxing station, generally indicated at 20, and a pre-heating station, generally indicated at 22, to condition the printed circuit board for wave soldering. Once conditioned (i.e., fluxed and heated), the printed circuit board 12 travels to a wave soldering station, generally indicated at 24, to apply solder material to the printed circuit board. A controller 26 is provided to automate the operation of the several stations of the wave soldering machine 10, including but not limited to the fluxing station 20, the pre-heating station 22, and the wave soldering station 24, in the well-known manner.

Figure 2:
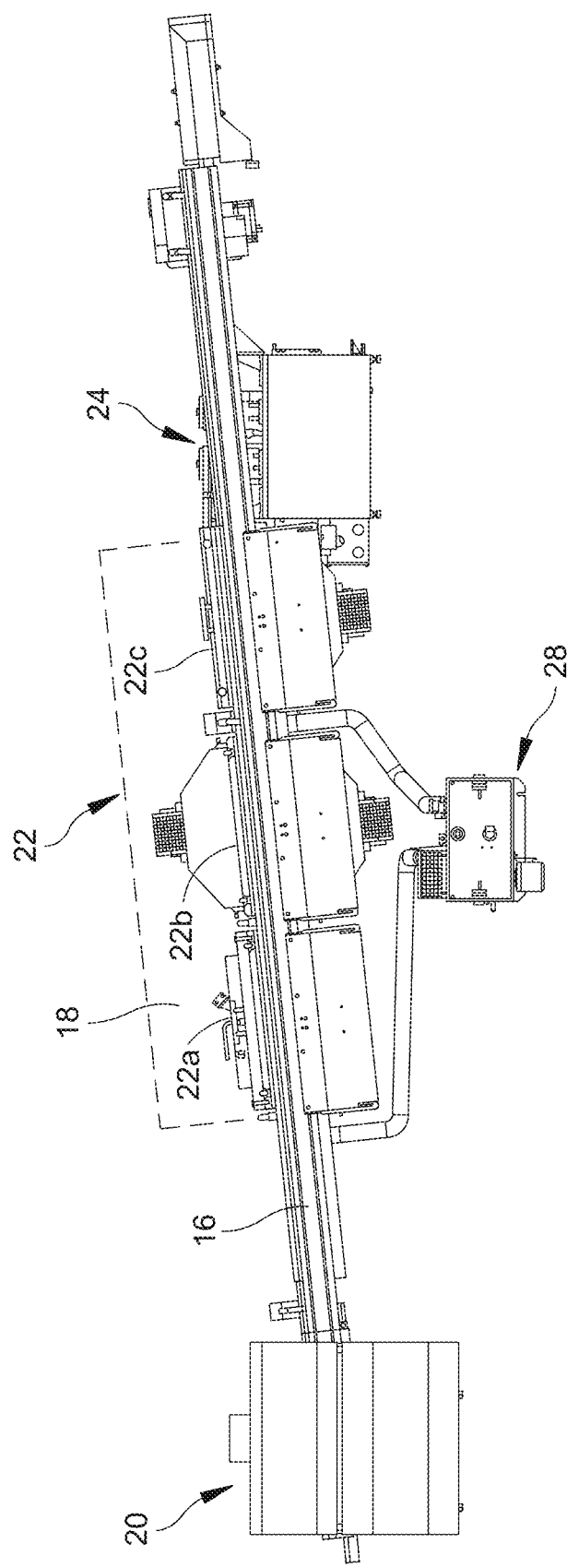
FIG. 2 is a side elevational view of the wave soldering machine with external packaging removed to reveal internal components of the wave soldering machine.

Referring to FIG. 2, the fluxing station 20 is configured to apply flux to the printed circuit board 12 as it travels on the conveyor 16 through the tunnel 18 of the wave soldering machine 10. The pre-heating station 22 includes several pre-heaters (e.g., pre-heaters 22a, 22b and 22c), which are designed to incrementally increase the temperature of the printed circuit board 12 as it travels along the conveyor 16 through the tunnel 18 to prepare the printed circuit board 12 for the wave soldering process. As shown and described in greater detail below, the wave soldering station 24 includes a wave solder nozzle assembly in fluid communication with a reservoir of solder material. A pump is provided within the reservoir to deliver molten solder material to the wave soldering nozzle assembly from the reservoir. Once soldered, the printed circuit board 12 exits the wave soldering machine 10 via the conveyor 16 to another station provided in the fabrication line, e.g., a pick-and-place machine.

In some embodiments, the wave soldering machine 10 further may include a flux management system, generally indicated at 28, to remove volatile contaminants from the tunnel 18 of the wave soldering machine 10. As shown in FIG. 2, the flux management system 28 is positioned below the pre-heating station 22. In one embodiment, the flux management system 28 is supported by the housing 14 within the wave soldering machine 10, and is in fluid communication with the tunnel 18, which is schematically illustrated in FIG. 2. The flux management system 28 is configured to receive contaminated gas from the tunnel 18, treat the gas, and return clean gas back to the tunnel 18. The flux management system 28 is particularly configured to remove volatile contaminants from the gas, especially in inert atmospheres.

Figure 3:
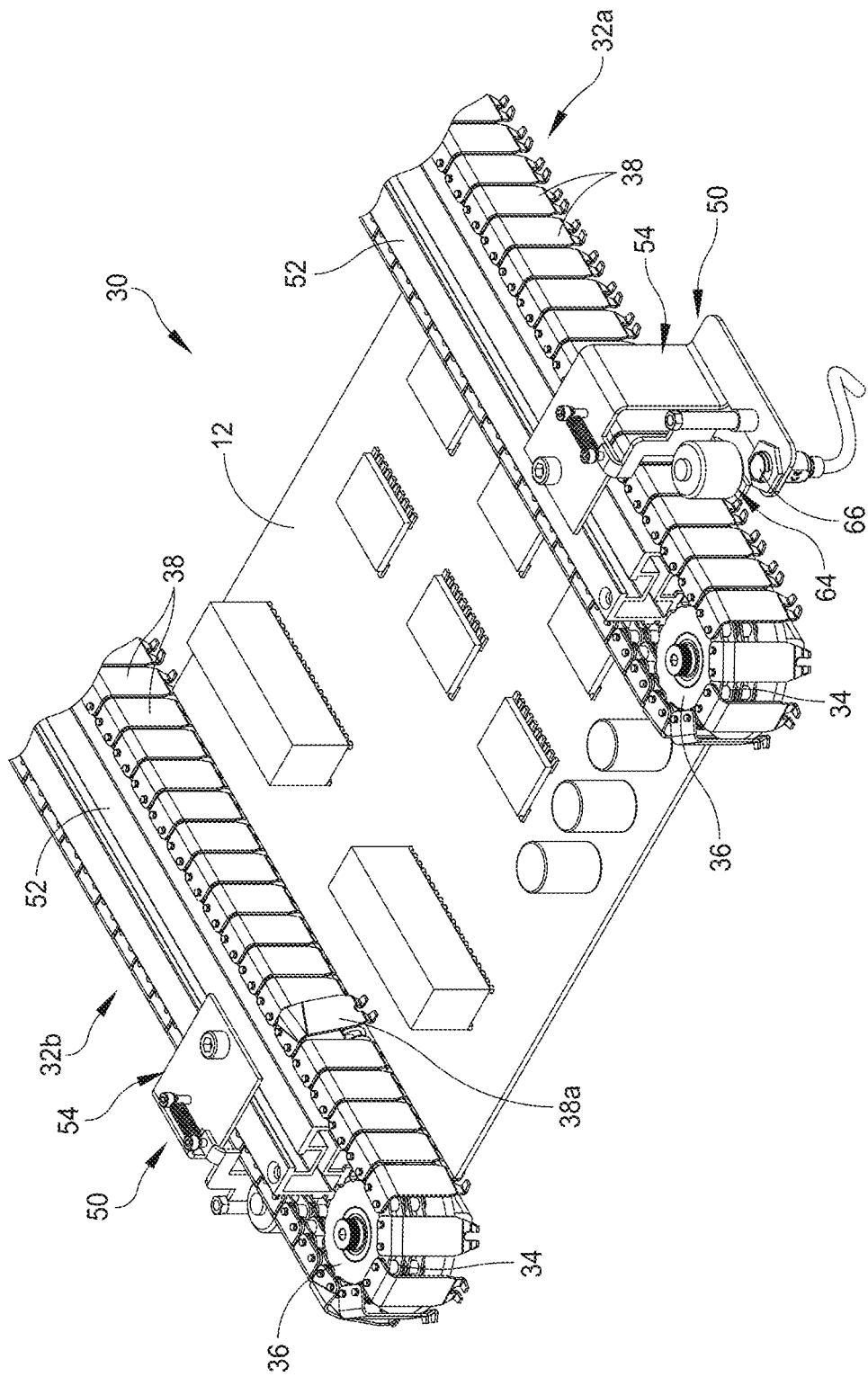
FIG. 3 is a perspective view of a portion of a finger conveyor system of the wave soldering machine showing a finger detection system of an embodiment of the present disclosure.

Referring to FIG. 3, a portion of a finger conveyor system, generally indicated at 30, is shown supporting the printed circuit board 12. The finger conveyor system 30 functions as the conveyor 16 provided in the wave soldering machine 10. The finger conveyor system 30 is configured to support opposing lateral edges of the printed circuit board 12 and to move the printed circuit board 12 within the tunnel 18 of the wave soldering machine 10 to the fluxing station 20, the pre-heating station 22, and the soldering station 24. In one embodiment, the finger conveyor system 30 includes two chain conveyors, indicate generally at 32a, 32b, that each embody an endless chain configured to move through the tunnel 18 of the wave soldering machine 10 to present the printed circuit board 12 to the wave soldering station 24. The chain conveyors 32a, 32b are spaced apart from one another and can be adjusted to accommodate a width of the printed circuit board 12. In some embodiments, chain conveyor 32a may be referred to as a first chain conveyor and chain conveyor 32b may be referred to as a second chain conveyor.

As shown, each chain conveyor 32a, 32b includes a chain 34 that runs over a sprocket 36 provided at an end of the chain conveyor. An opposite end of each chain conveyor 32a, 32b includes a similar sprocket 36. The chain 34 is powered to move about the sprockets 36 by a motor coupled to one of the sprockets 36 of the chain conveyor 32a, 32b. The motor is coupled to the controller 26 to control the operation of the chain conveyors 32a, 32b, including but not limited to a speed at which the chain 34 travels during operation.

Figure 4:
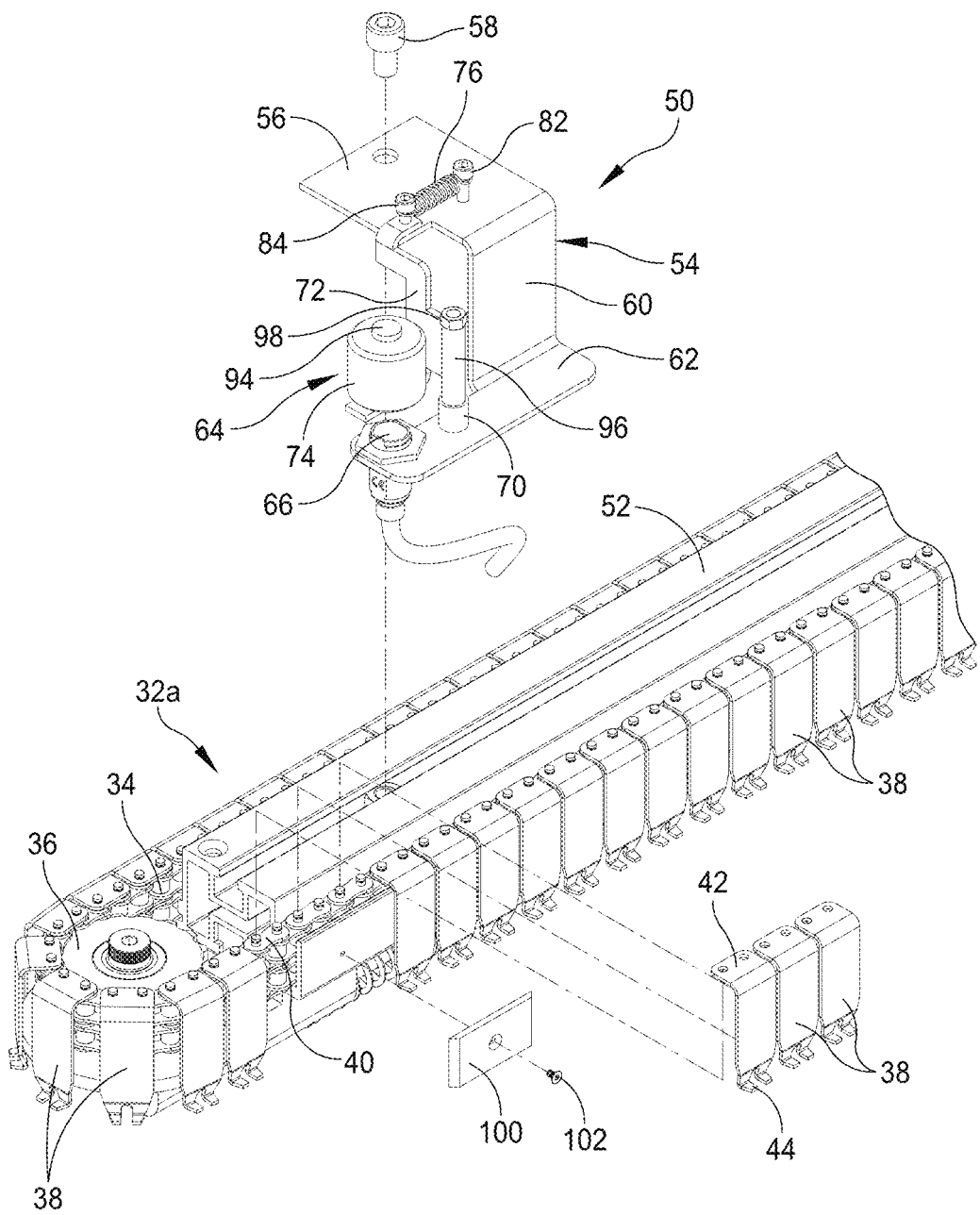
FIG. 4 is an exploded perspective view of a chain conveyor of the finger conveyor system showing the finger detection system spaced from the chain conveyor.

Referring additionally to FIG. 4, each chain conveyor 32a, 32b includes fingers, each indicated at 38, connected to the chain 34 to convey the printed circuit board 12 through the tunnel 18 of the wave soldering machine 10. The fingers 38 are secured to the chain 34 so that the fingers 38 are spaced close to one another, with each finger 38 being secured to a link 40 of the chain 34. In one embodiment, each finger 38 includes an elongated body having a top bent portion 42 that extends from the elongated body in one direction and a bottom foot portion 44 that extends from the body in an opposite direction. As shown, bottom foot portion 44 embodies two feet. The top bent portion 42 has two small openings formed therein. Each opening is configured to receive a pin of the link 40 of the chain 34 to secure the finger 38 to the chain 34 of the chain conveyor 32a, 32b. The bottom foot portion 44 of the finger 38 is configured to support an edge of the printed circuit board 12 in the manner shown in FIG. 3. Each finger 38 can be fabricated from a suitable metal, such as stainless steel or a stainless steel alloy.

Figure 5:
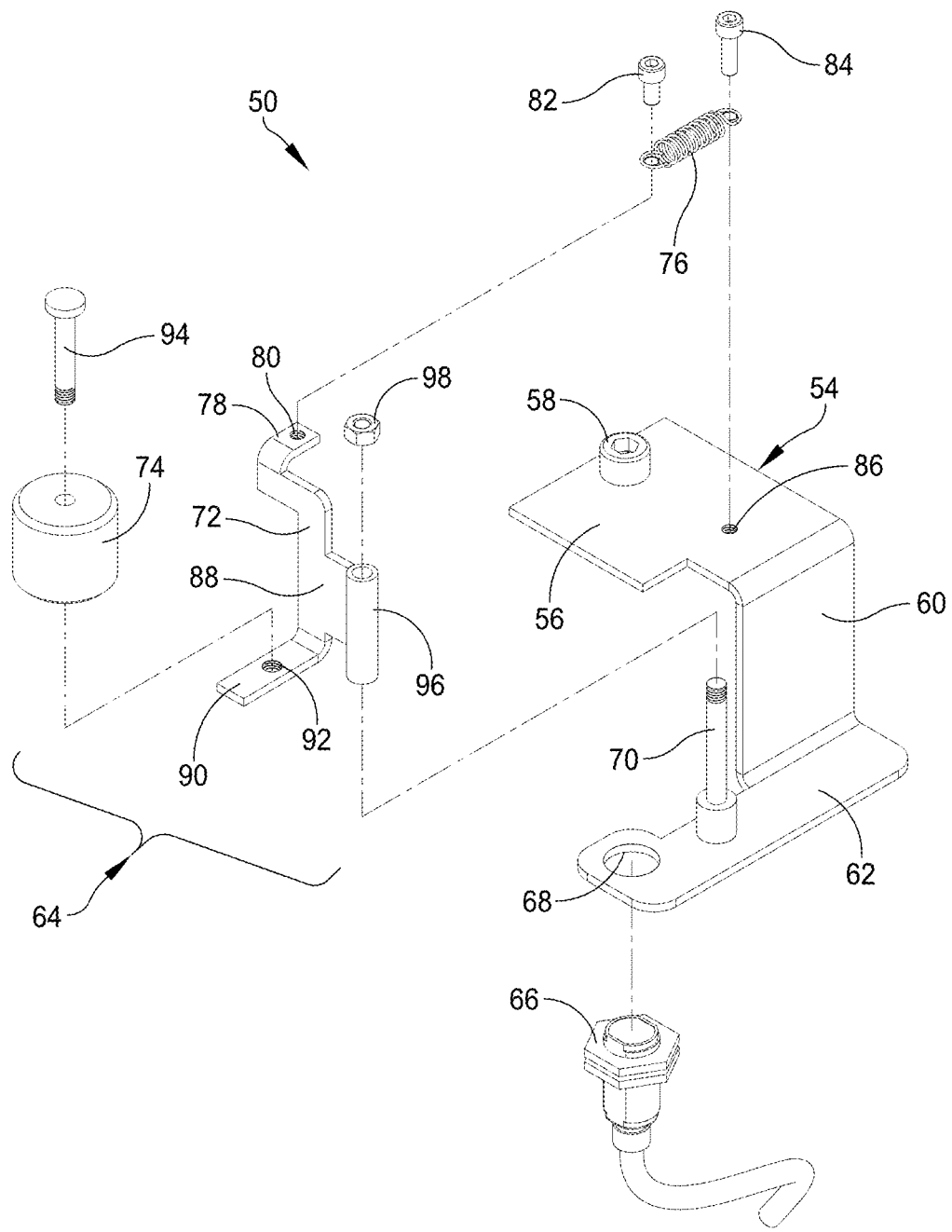
FIG. 5 is an exploded perspective view of the finger detection system.

Referring additionally to FIG. 5, for each chain conveyor 32a, 32b, the finger conveyor system 30 further includes a finger detection system, generally indicated at 50, which is secured to a frame member 52 of the housing 14 of the wave soldering machine 10. With additional reference to FIG. 4, each finger detection system 50 includes a bracket, generally indicated at 54, which is shaped to secure the components of the finger detection system 50. The bracket 54 includes a horizontal top flange 56, which is secured to the frame member 52 of the housing 14 by a suitable fastener 58, such as a machine screw fastener. The bracket 54 further includes a vertical middle portion 60 and a horizontal bottom flange 62, which supports a tension roller assembly, generally indicated at 64, and a sensor 66. The bottom flange 62 further includes a relatively large opening 68 formed therein, which is provided to secure the sensor 66 to the bottom flange 62 of the bracket 54. The sensor 66 may be secured to the bottom flange 62 of the bracket 54 by any suitable manner. The bottom flange 62 of the bracket 54 further supports a cylindrical post 70, which extends upwardly and perpendicularly from the bottom flange 62. In one embodiment, the top flange 56 extends from the middle portion 60 in one direction and the bottom flange 62 extends from the middle portion 60 in an opposite direction.

As noted, the finger detection system 50 includes the tension roller assembly 64, which is pivotally secured to the bracket 54. As shown, the tension roller assembly 64 includes several components, including a roller bracket 72, a tension roller 74, and a spring 76. The roller bracket 72 includes a horizontal top tab 78 having a threaded opening 80 formed therein that is configured to receive a fastener 82, such as a machine screw fastener, to secure the spring 76 to the roller bracket 72. Specifically, the fastener 82 secures one end of the spring 76 to the top tab 78 within the threaded opening 80, and another fastener 84, such as a machine screw fastener, is provided to secure an opposite end of the spring 76 to a threaded opening 86 formed in the top flange 56 of the bracket 54.

The roller bracket 72 further includes a vertical middle portion 88 and a horizontal bottom tab 90 having a threaded opening 92 formed therein that is configured to receive a fastener 94, such as a machine screw fastener, to secure the tension roller 74 to the roller bracket 72. Once secured, the tension roller 74 is configured to rotate about the fastener 94. In one embodiment, an outer surface of the tension roller 74 of the tension roller assembly 64 is fabricated from a metal, such as stainless steel, to provide a smooth, low friction surface that engages the fingers 38 as the fingers 38 move across the tension roller 74.

The roller bracket 72 further includes a cylindrical portion 96 that extends from the middle portion 88 of the roller bracket 72. The cylindrical portion 96 is configured to slide over the post 70 to enable the roller bracket 72 to pivot with respect to the bracket 54. Once slid over the post 70, a threaded nut 98 is provided to secure the cylindrical portion 96 in place of the roller bracket 72 on the post 70. Referring back to FIGS. 3 and 4, the arrangement is such that the tension roller 74 of the tension roller assembly 64 under the tension of the spring 76 is normally disposed in a first position in which the middle portion 88 of the roller bracket 72 engages an edge of the top flange 56 of the bracket 54. The tension roller assembly 64 is configured to achieve a second, non-operational position in which the tension roller assembly 64 pivots away from the bracket 54, e.g., when the tension roller 74 engages a finger 38 that is in a non-operational position, which will be described in greater detail below.

As best shown in FIG. 5, the finger detection system 50 further includes the sensor 66 secured to the bottom flange 62 of the bracket 54. In one embodiment, the sensor 66 may embody a positional sensor, such as an absolute encoder. The sensor 66 is secured to the bottom flange 62 of the bracket 54 so that the sensor 66 is offset from a bottom of the tension roller 74 of the tension roller assembly 64 when the tension roller 74 is in the biased first position. The sensor 66 is configured to detect when the tension roller 74 is moved to the second, non-operational position, with the tension roller 74 being positioned over the sensor 66 from its otherwise offset position. In one embodiment, the sensor 66 is coupled or otherwise connected to the controller 26, so that when the sensor 66 detects movement of the tension roller 74 to the second position, a signal is sent from the sensor 66 to the controller 26.

In an alternative embodiment, the sensor 66 can be secured to the bottom flange 62 of the bracket 54 so that the sensor 66 is aligned with the bottom of the tension roller 74 of the tension roller assembly 64 when the tension roller 74 is in the biased first position. The sensor 66 can be configured to detect when the tension roller 74 is moved to the second position, with the tension roller 74 being positioned away from the sensor 66 from its otherwise aligned position. The sensor 66 can be configured to detect the movement of the tension roller 74 of the tension roller assembly 64 to the second position to send a signal to the controller 26.

Referring back to FIG. 4, the finger detection system 50 further includes an engagement plate 100, which is secured to a portion of the frame member 52 of the housing 14 of the wave soldering machine 10. In one embodiment, the engagement plate 100 may embody a metal alloy, such as brass, that provides a smooth, low friction surface upon which each finger 38 engages when engaged by the tension roller 74 of the tension roller assembly 64. The engagement plate 100 is secured to the portion of the frame member 52 by a fastener 102, such as a machine screw fastener. The engagement plate 100 may be fabricated from any suitable metal that provides a low friction surface.

Figure 6:
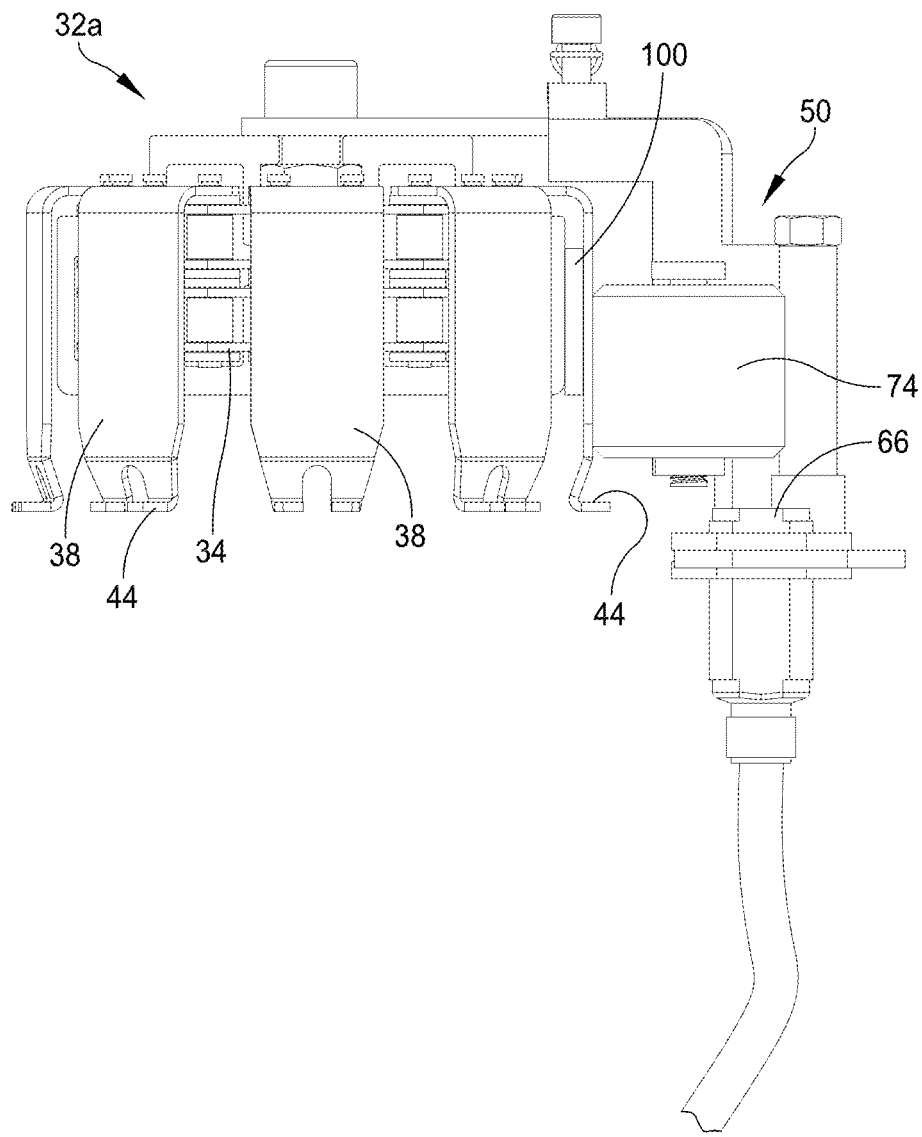
FIG. 6 is an end view of the chain conveyor showing a tension roller of the finger detection system engaging a finger in an operable position of the chain conveyor.

Referring to FIG. 6, the tension roller 74 of the tension roller assembly 64 of the finger detection system 50 is shown in the first position. As shown, the tension roller 74 engages the finger 38 as the finger 38 travels across the engagement plate 100. The engagement plate 100 provides a resistance surface to the tension roller 74, with the tension roller 74 rotating when engaging the finger 38. The tension roller 74 is configured to engage every finger 38 of the chain conveyors 32a, 32b during the operation of the finger conveyor system 30.

Figure 7:
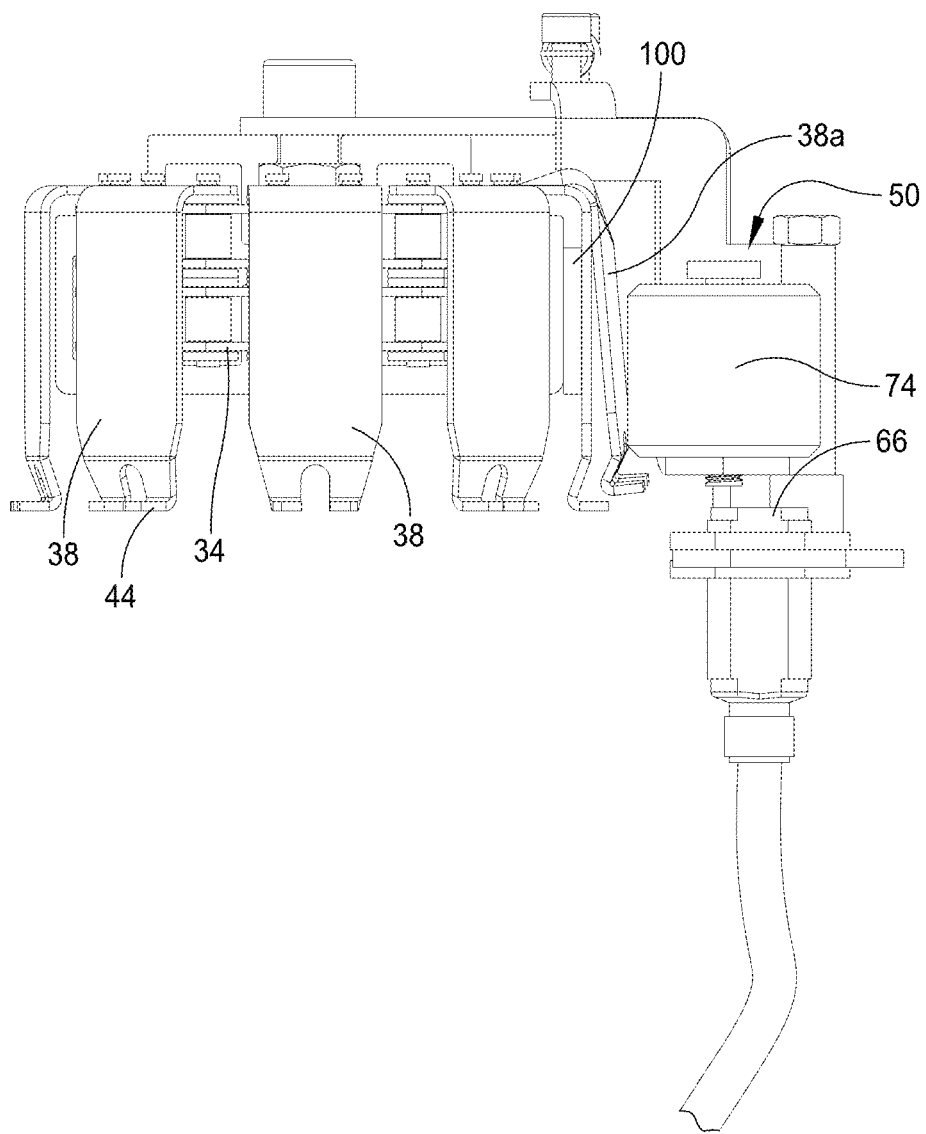
FIG. 7 is an end view similar to FIG. 6 showing the tension roller of the finger detection system engaging a displaced finger of the chain conveyor.

Referring to FIG. 7, in the event of an out-of-place or displaced finger 38, which as noted is sometimes referred to as a non-operational finger, passes by the tension roller 74 of the tension roller assembly 64 of the finger detection system 50, the displaced finger, indicated at 38a, engages the tension roller 74 to move the tension roller 74 and the tension roller assembly 64 to the second position. When this movement occurs, the sensor 66 detects the movement of the tension roller assembly 64 to the second position, with the tension roller 74 of the tension roller assembly 64 being positioned over the sensor 66 from its offset, first position. The sensor 66 is configured to generate a signal to the controller 26, which can notify an operator of the wave soldering machine 10 or the printed circuit board fabrication line of the displaced finger 38a.

Figure 8:
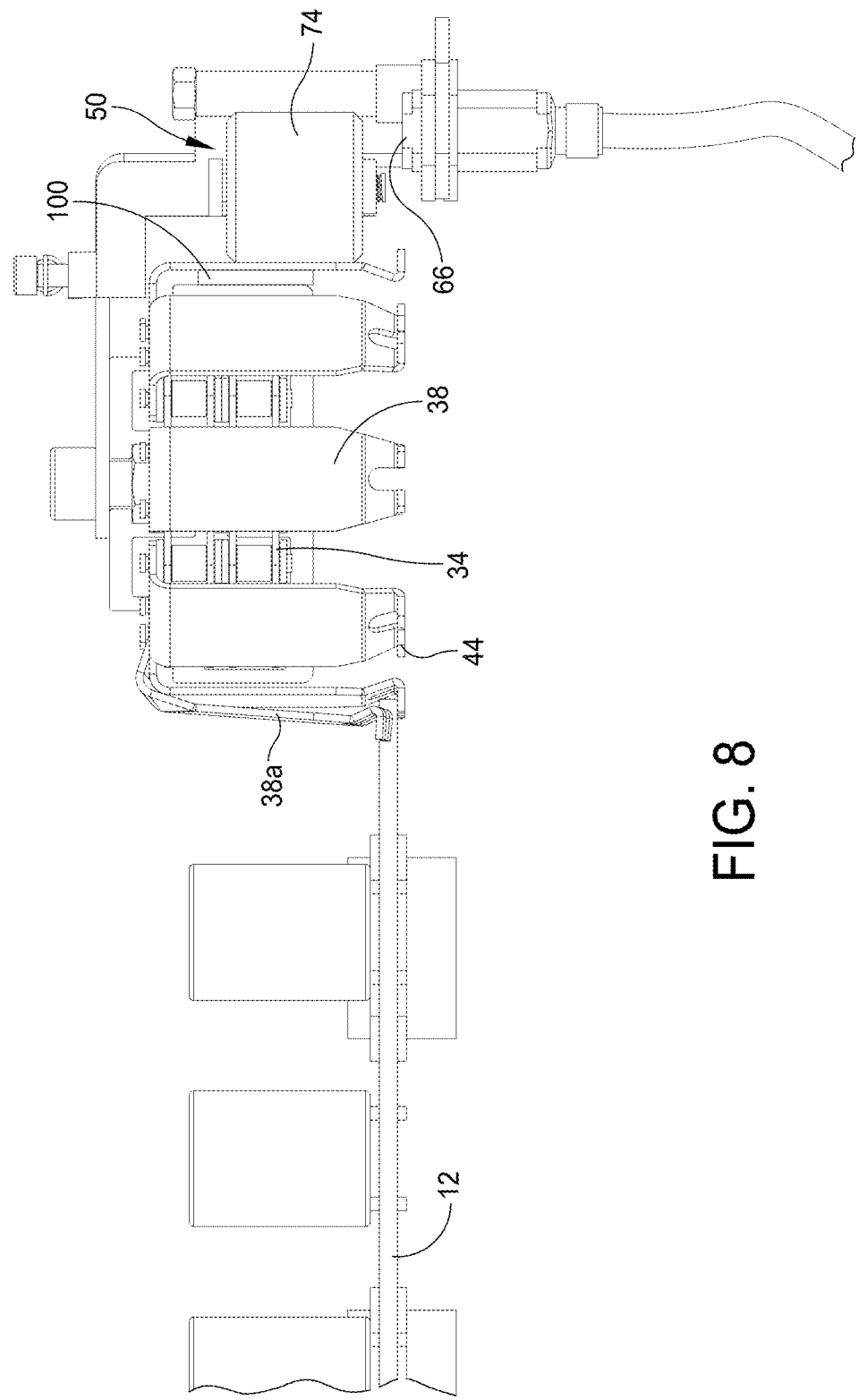
FIG. 8 is an end view of the chain conveyor showing the fingers supporting a printed circuit board and a displaced finger of the chain conveyor.

Referring to FIG. 8, the displaced finger 38a is shown prior to reaching the finger detection system 50. As shown, the other fingers 38 are configured to support the printed circuit board 12 in a generally horizontal position (e.g., six degrees with respect to horizontal), with the bottom foot portions 44 of the fingers 38 supporting a bottom edge of the printed circuit board 12. The displaced finger 38a is shown to be misaligned with respect to the other fingers 38.

Figure 9:
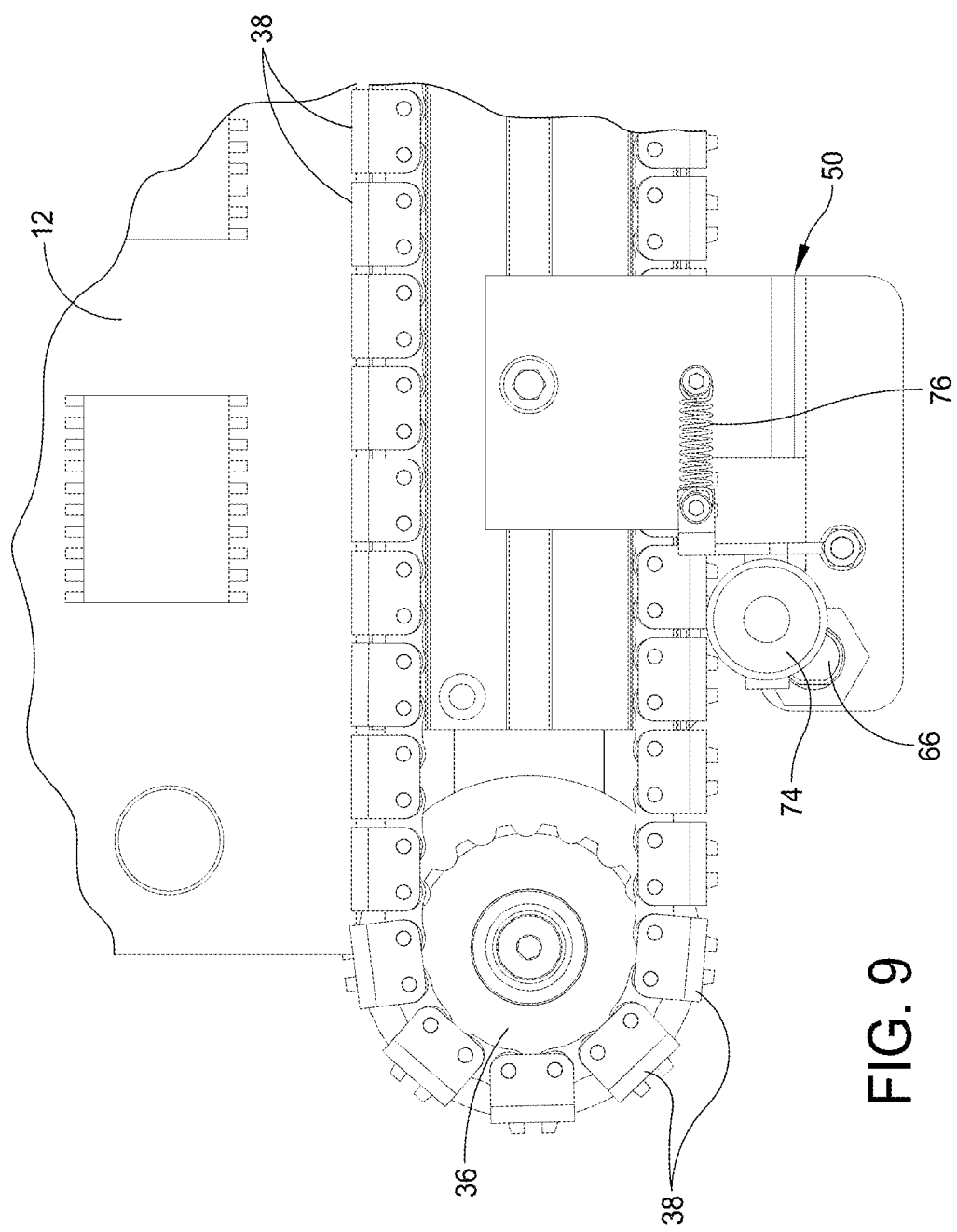
FIG. 9 is a top plan view of the chain conveyor shown in FIG. 8.
Figure 10:
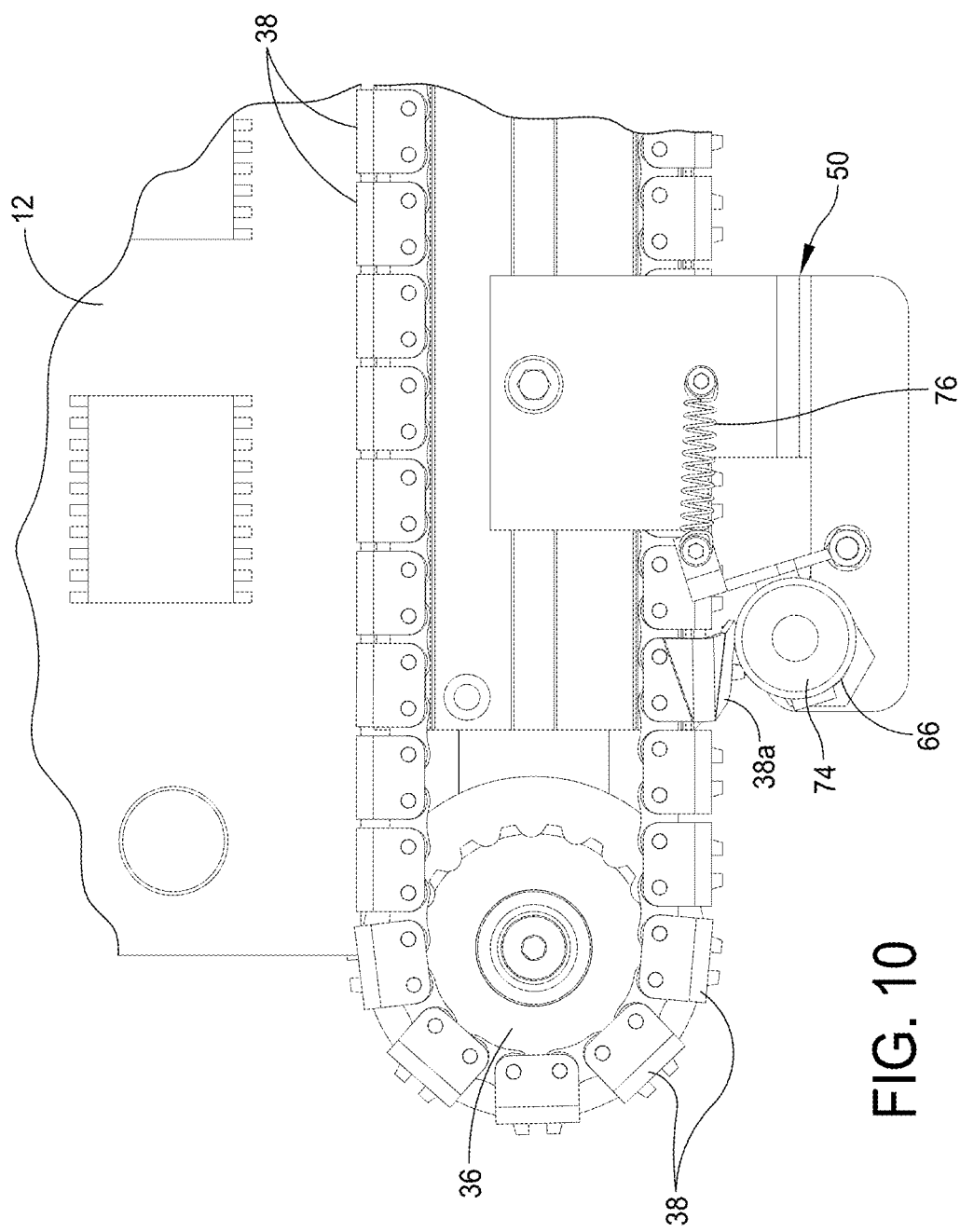
FIG. 10 is a top plan view similar to FIG. 9 showing the tension roller engaging a displaced finger of the chain conveyor.

Referring to FIGS. 9 and 10, the finger detection system 50 in FIG. 9 is shown engaging a finger 38 as the fingers 38 come across the finger detection system 50. In some circumstances, the tension roller 74 of the tension roller assembly 64 of the finger detection system 50 engages each finger 38, and in some instances, can reset a finger 38 that is slightly out of alignment with respect to the other fingers 38. As shown, the tension roller 74 engages the finger 38, with the engagement plate 100 providing a resisting force against the finger 38.

Figure 11:
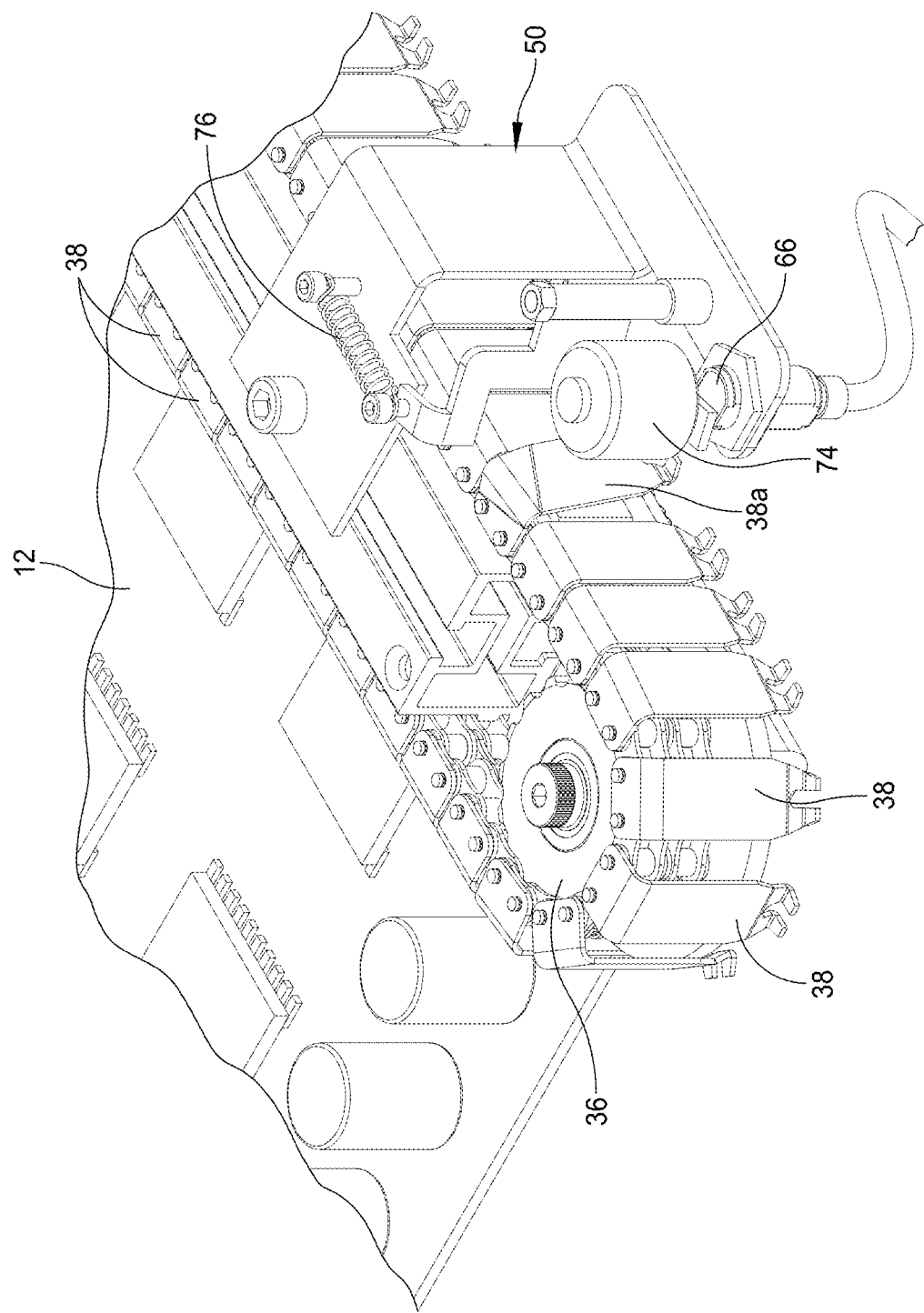
FIG. 11 is a perspective view of the tension roller shown in FIG. 10.

The finger detection system 50 in FIG. 10 is shown engaging a displaced finger 38a, which causes the tension roller 74 and the tension roller assembly 64 to pivot away from the first position to the second position. This motion causes the sensor 66 to detect the presence of the tension roller 74 of the tension roller assembly 64 to generate a signal to the controller 26. Once the displaced finger 38a passes by the finger detection system 50, the spring 76 causes the tension roller 74 and the tension roller assembly 64 to pivot back to the first position. FIG. 11 shows the movement of the tension roller 74 and the tension roller assembly 64 to the second position as well.

A method of detecting the out-of-place finger 38a of the finger conveyor system 30 is further disclosed. In one embodiment, the method includes supporting an edge of the printed circuit board 12 with the chain conveyors 32a, 32b each including the chain 34 having the plurality of fingers 38. Specifically, the printed circuit board 12 is supported by the bottom foot portions 44 of the fingers 38. The method further includes detecting whether a finger 38 is in a non-operation position, e.g., the displaced finger 38a, with the tension roller 74 of the tension roller assembly 64 of the finger detection system 50, with the tension roller 74 being configured to engage each finger 38 of the fingers 38 of the finger conveyor system 30. The tension roller assembly 64 further is configured to move in response to engaging the displaced finger 38a finger, which is disposed in a non-operational position.

In some embodiments, the detecting whether the displaced finger 38a is in the non-operational position further includes sensing movement of the tension roller 74 and the tension roller assembly 64 to the non-operational position with the sensor 66. The sensor 66 is coupled to the controller 26, with the sensor 66 being configured to detect movement of a tension roller 74 of the tension roller 64 to the second position and generate a signal to the controller 26.

Various controllers may execute various operations discussed above. For example, as discussed above, the controller, such as controller 26, may control the components of the wave soldering machine 10 including the wave soldering station 24 and the finger conveyor system 30, amongst other operations. Using data stored in associated memory and/or storage, the controller may execute one or more instructions stored on one or more non-transitory computer-readable media, which the controller may include and/or be coupled to, that may result in manipulated data. In some examples, the controller may include one or more processors or other types of controllers. In one example, the controller is or includes at least one processor. In another example, the controller performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A wave soldering machine to perform a wave soldering operation on a printed circuit board, the wave soldering machine comprising:
   a housing;
   a wave soldering station coupled to the housing, the wave soldering station being configured to create a solder wave used to perform the wave soldering operation on the printed circuit board; and
   a finger conveyor system coupled to the housing and configured to deliver a printed circuit board through the housing to the wave soldering station, the finger conveyor system including
      a first chain conveyor having a first chain with a first plurality of fingers configured to support an edge of the printed circuit board,
      a second chain conveyor having a second chain with a second plurality of fingers configured to support an opposite edge of the printed circuit board,
      a first finger detection system positioned proximate to the first chain conveyor, and
      a second finger detection system positioned proximate to the second chain conveyor, each of the first finger detection system and the second finger detection system including
         a tension roller assembly configured to engage each finger of the plurality of fingers, the tension roller assembly further being configured to move in response to engaging a finger in a non-operational position, and
         a sensor configured to detect movement of the tension roller assembly to the non-operational position.

2. The wave soldering machine of claim 1, wherein the chain of each chain conveyor runs over a sprocket provided at an end of the chain conveyor.

3. The wave soldering machine of claim 2, wherein the plurality of fingers of each chain conveyor is connected to the chain to convey the printed circuit board through the frame of the wave soldering machine.

4. The wave soldering machine of claim 3, wherein the finger detection system includes a bracket configured to be coupled to the housing.

5. The wave soldering machine of claim 4, wherein the bracket includes a top flange configured to be secured to the housing and a bottom flange configured to pivotally support the tension roller assembly and to support the sensor.

6. The wave soldering machine of claim 5, wherein the tension roller assembly includes a roller bracket, a tension roller, a post, and a spring, which are configured to bias the tension roller in a first, operational position, the first position being spaced from the non-operational position.

7. The wave soldering machine of claim 6, wherein the roller bracket includes a top tab configured to be secured to the top flange of the bracket via the spring and a bottom tab configured to support the tension roller.

8. The wave soldering machine of claim 7, wherein the roller bracket further includes a middle portion having a cylindrical portion configured to slide over the post to enable the roller bracket to pivot with respect to the bracket.

9. The wave soldering machine of claim 6, wherein the tension roller under the tension of the spring is normally disposed in the first position in which a middle portion of the roller bracket engages an edge of the top flange of the bracket, the tension roller being configured to achieve a second position in which the tension roller pivots away from the bracket.

10. The wave soldering machine of claim 6, wherein the sensor is coupled to a controller, the sensor being configured to detect movement of the tension roller to the second position and generate a signal to the controller.

11. The wave soldering machine of claim 6, wherein the finger detection system further includes an engagement plate configured to engage a finger of the plurality of fingers when the tension roller is in the first position.

12. A finger conveyor system for a wave soldering machine configured to perform a wave soldering operation on a printed circuit board, the finger conveyor system comprising:
   a chain conveyor including a chain having a plurality of fingers configured to support an edge of the printed circuit board; and
   a finger detection system positioned proximate to the chain conveyor, the finger detection system including
      a tension roller assembly configured to engage each finger of the plurality of fingers, the tension roller assembly further being configured to move in response to engaging a finger in a non-operational position, and
      a sensor configured to detect movement of the tension roller assembly to the non-operational position.

13. The finger conveyor system of claim 12, wherein the chain conveyor includes a first chain conveyor having a first chain with a first plurality of fingers configured to support an edge of the printed circuit board and a second chain conveyor having a second chain with a second plurality of fingers configured to support an opposite edge of the printed circuit board, the finger detection system being associated with each chain conveyor.

14. The finger conveyor system of claim 13, wherein the chain of each chain conveyor runs over a sprocket provided at an end of the chain conveyor, the plurality of fingers of each chain conveyor is connected to the chain to convey the printed circuit board through the frame of the wave soldering machine, the finger detection system includes a bracket configured to be coupled to the housing, the bracket including a top flange configured to be secured to housing and a bottom flange configured to pivotally support a tension roller assembly and to support the sensor, the tension roller assembly including a roller bracket, a tension roller, a post, and a spring, which are configured to bias the tension roller in a first position, which is spaced from the non-operational position.

15. A method of detecting a finger of a finger conveyor system in a non-operational position within a wave soldering machine configured to of claim 1, the method comprising:
   supporting an edge of the printed circuit board with the chain of the chain conveyor; and
   detecting whether a finger of the plurality of fingers is in a non-operation position with the tension roller assembly.

16. The method of claim 15, wherein detecting whether the finger of the plurality of fingers is in the non-operational position further includes sensing movement of the tension roller assembly to the non-operational position.

17. The method of claim 16, wherein the chain conveyor includes a first chain conveyor having a first chain with a first plurality of fingers configured to support an edge of the printed circuit board and a second chain conveyor having a second chain with a second plurality of fingers configured to support an opposite edge of the printed circuit board, the finger detection system being associated with each chain conveyor.

18. The method of claim 17, wherein the tension roller assembly includes a roller bracket, a tension roller, a post, and a spring, which are configured to bias the tension roller in a first position, which is spaced from the non-operational position.

19. The method of claim 16, wherein sensing movement of the tension roller assembly is achieved by a sensor coupled to a controller, the sensor being configured to detect movement of a tension roller of the tension roller to the second position and generate a signal to the controller.

* * * * *